May 11, 1926.

R. S. WILLIAMSON

APPLIANCE FOR PLAYING GAMES

Filed Sept. 3, 1924

Inventor
Ralph Stanley Williamson
by Knight Bro
Attorneys

May 11, 1926.
R. S. WILLIAMSON
APPLIANCE FOR PLAYING GAMES
Filed Sept. 3, 1924
1,584,062
2 Sheets-Sheet 2
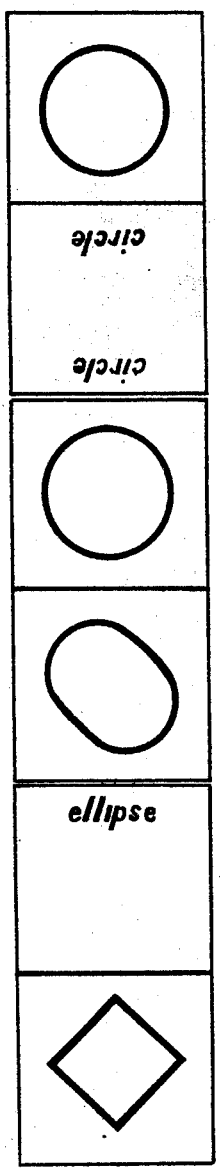
Fig.3.
Fig.2.
Inventor
Ralph Stanley Williamson
by Knight Bro attorney Patented May 11, 1926.

1,584,062

UNITED STATES PATENT OFFICE.

RALPH STANLEY WILLIAMSON, OF CAMBRIDGE, ENGLAND.

APPLIANCE FOR PLAYING GAMES.

Application filed September 3, 1924. Serial No. 735,589.

This invention relates to improvements in tablets for games.

In games of dominoes, tablets are marked with numbers of spots and different dominoes are matched by placing together those portions of the tablets on which are marked the same number of spots. Markings on one tablet are placed in juxtaposition to identical markings on another tablet.

It is an object of the present invention to provide dominoes in the form of tablets which may be matched by juxtaposing markings which are not identical but which are equivalent in that they give rise to the same idea. It is a further object of the invention to provide pairs of tablets so marked as to be adapted to be matched not by identity of the marking but by virtue of the equivalence of the ideas suggested by said markings.

I use the term "tablet" to include the well-known "pieces" used in playing games such as cards, dominoes or tiles. I prefer, however, to use rigid pieces of the same form as dominoes and like these the pieces are preferably rectangular and decorated on one side with two markings.

I shall now proceed to describe, by way of example only, what suitable markings may be placed on the tablets. It is preferred that such markings shall have definite educational value suited to children of different ages.

The invention is illustrated by the accompanying drawings, in which:

Figure 1 shows tablets marked on one portion with a colour and on the other portion with the name of a colour (in most cases the name of a different colour). In playing a game a tablet is placed face upwards on the table. Another tablet is then "played" by placing in a position such that the colour on one table is adjacent to the name of that colour on the other tablet. The game is continued by "playing" the tablets serially so that each colour is matched by its appropriate name on the adjacent portion of the adjoining tablet.

Figure 2 shows tablets marked on one portion with pictures of animals and on the other portion with names of animals. The tablets are then matched by juxtaposing the delineation of the animal with its appropriate name.

Figure 3 shows geometrical figures printed on tablets so that by juxtaposing the figure with its appropriate name the tablet may be matched.

Figures 1, 4:
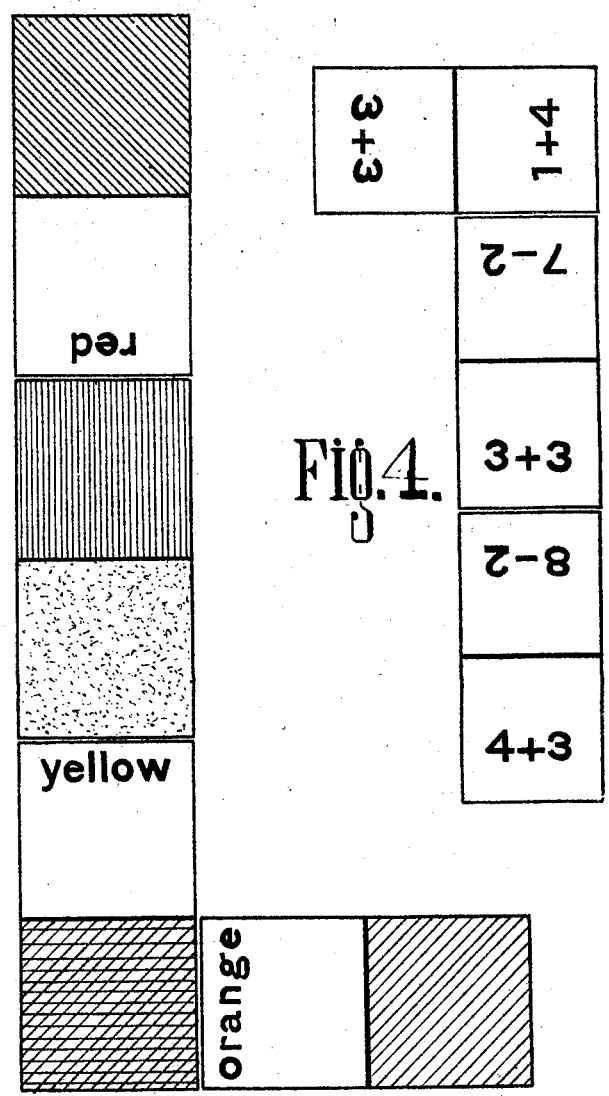
Figure 4 shows mathematical sums, for example simple additions, depicted on different tablets. The tablets are then matched by equivalence of the results obtained after carrying out the mathematical operation indicated.

Other markings than those indicated above may be employed provided that pairs or groups of such markings indicate a common idea expressed in a dissimilar manner, i. e. provided that the markings on different tablets may be mentally "equated" so that the tablets may be matched serially.

I use the work "marking" to include words, designs, colours, pictures or other decorations or embellishments printed, painted, embossed, engraved or otherwise applied, and I use the word "picture" generically, e. g. to include drawings, silhouettes or coloured illustrations applied superficially, in intaglio or in relief.

I use the expression "complete marking" to indicate a marking which is complete in itself and does not form a part of a composite marking such as a dissected drawing or picture.

I declare that what I claim is:—

1. For use in a game a plurality of tablets each having complete markings thereon and adapted to be matched serially by juxtaposing markings on different tablets which markings are different but represent equivalent ideas.

2. For use in a game a plurality of tablets each having two complete markings thereon and adapted to be matched serially by juxtaposing markings on different tablets which markings are not identical but are equivalent.

3. For use in a game a plurality of tablets each having complete markings thereon and adapted to be matched serially by juxtaposing markings on different tablets which markings are different but have a common mental interpretation.

4. For use in a game, a plurality of tablets adapted to be matched serially by juxtaposing pictures on certain tablets with words representing said pictures on other tablets.

5. For use in a game, a plurality of tablets having pictures and equivalent words respectively, thereon, pairs of said tablets being adapted to be matched, not by identity of the markings but by virtue of the association between said pictures and words.

6. For use in a game, a plurality of tablets adapted to be matched serially by juxtaposing objects and names respectively on different tablets.

7. For use in a game, a plurality of tablets having objects and names respectively, marked thereon, pairs of said tablets being adapted to be matched, not by identity of the markings but by virtue of the association between the object and its name.

8. For use in a game a plurality of tablets each having on one face two markings which comprise a name of an animal and a picture of an animal, the said tablets being adapted to be matched serially by juxtaposing the picture of an animal on one tablet with its name on another tablet.

In witness whereof, I have hereunto signed my name this 22nd day of August, 1924.

RALPH STANLEY WILLIAMSON.